United States Patent [19]

Priem

[11] Patent Number: 5,214,811
[45] Date of Patent: Jun. 1, 1993

[54] WATERTIGHT UPHOLSTERY BUTTON

[75] Inventor: Ronald J. Priem, Milwaukee, Wis.

[73] Assignee: Milsco Manufacturing Company, Milwaukee, Wis.

[21] Appl. No.: 911,277

[22] Filed: Jul. 9, 1992

[51] Int. Cl.⁵ .............................................. A47C 31/02
[52] U.S. Cl. ............................................ 5/472; 5/408; 24/90 B; 24/90 E
[58] Field of Search .................. 5/408, 409, 410, 471, 5/472, 473; 24/90 B, 90 C, 90 E, 92, 113 R

[56] References Cited

U.S. PATENT DOCUMENTS

| | | | |
|---|---|---|---|
| 1,867,041 | 7/1932 | Walters | 5/472 X |
| 2,288,130 | 6/1942 | Forney | 5/408 |
| 3,266,065 | 8/1961 | Bereday | 5/408 |
| 3,408,105 | 10/1968 | Portell | 24/113 R X |
| 3,443,472 | 5/1969 | Darr, Jr. et al. | |
| 3,449,802 | 6/1969 | Mackey | |
| 3,829,935 | 8/1974 | Critchfield | 24/90 B |
| 3,967,348 | 7/1976 | Roger | 24/90 C X |
| 4,169,302 | 10/1979 | Ferguson | 24/113 R |
| 4,283,815 | 8/1981 | Henshaw | |
| 4,672,719 | 8/1987 | Scott | 24/92 X |
| 4,841,604 | 6/1989 | Stevens | |
| 5,095,596 | 3/1992 | Dahood | |

Primary Examiner—Michael F. Trettel
Attorney, Agent, or Firm—Nilles & Nilles

[57] ABSTRACT

An upholstery button includes a collet, an anchor, and a lock washer. A seat or cushion cover is securely clamped between the head of the collet and the lock washer. The lock washer is locked in position without the action of any other clamping elements by the cooperation of the lock washer and ribs formed on the shank of the collet. The resulting connection reduces the possibility of an occupant's body catching on the button and provides a watertight connection between the cover and the button, even upon failure of the anchor. Also disclosed is a process of connecting the upholstery button to the seat.

16 Claims, 3 Drawing Sheets

WATERTIGHT UPHOLSTERY BUTTON

BACKGROUND OF THE INVENTION

1. Field of the Invention

The invention relates to an upholstery button and more particularly relates to a watertight upholstery button for use in a seat or other cushion which may be exposed to water.

2. Description of the Related Art

Upholstery buttons are well known for ornamental purposes and for securing the cover of a seat or cushion to the foam core of the cushion. One such button is disclosed in U.S. Pat. No. 3,449,802, which issued to W. Mackey on Jun. 17, 1969. Referring to FIG. 10, this button 11 includes a collet 12 and a retainer 14. The collet 12 includes a head 16 which engages a cover 18 of a seat cushion 20. A shank 22 is connected to the head 16 of collet 12 and extends through the seat cushion 20. The retainer 14 lockingly engages a groove 24 formed in shank 22 and stresses the shank against a back cover 26 of cushion 20, thus compressing the cushion in the vicinity of head 16 and securing the cover 18 to the cushion 22.

In another known construction (not shown), an upholstery button includes a head, an eye hook or a pair of prongs extending from the bottom of the head, and an anchor including a string having a first end connected to the eye hook or prongs and a second end connected to a metal tee. In this construction, the head is seated on the front cover of the seat, and the string and metal tee are pulled through the cushion. The string is selected to be somewhat shorter than the thickness of the cushion so that the cushion is compressed when the string is pulled through it. The metal tee is then seated on a washer interposed between the washer and the back surface of the seat, thus anchoring the button hook in position.

While each of the devices described above satisfactorily connects a seat or cushion cover to the foam cushion of the seat, they are poorly suited for motorcycle seats or for any other applications in which a seat or cushion is exposed to the environment or may be exposed to moisture. More particularly, because the button of each of these devices engages the front cover of the seat only under the stress imposed on the button by the anchor cooperating with the back cover of the seat, there is considerable play between the button and the front cover of the seat. Accordingly, water may seep between the button and into the foam cushion under the seat cover. This water may subsequently be compressed back out of the cushion upon occupancy of the seat by the user, thus leading to considerable discomfort of the user. This play and the resulting susceptibility to water seepage is the most pronounced in the second type of button described above because the string-type anchor of this device permits more movement of the head of the button than does the rigid shank of the anchor of the first type of device. However, the string-type anchor of the second type of device is simpler and less expensive to manufacture and install than is the rigid anchor of the first type of device.

The problem of susceptibility to water seepage becomes especially pronounced in both devices described above if the anchor is rendered inoperative through loss of the retainer or through breakage of the string. When such an anchor is rendered inoperative, the stress between the head of the button and the front cover of the seat is removed, thus permitting even more seepage between the cover and the foam interior of the seat. In fact, since there would be in this situation no means whatsoever of retaining the head of the button in position, the head may very well be lost, thus leaving an unsightly hole in the seat cover which is very susceptible to water seepage both into and out of the seat.

OBJECTS AND SUMMARY OF THE INVENTION

It is therefore an object of the invention to provide an upholstery button which is inexpensive and convenient to manufacture and to install and which provides a permanent, watertight connection between the head of the button and the seat or cushion cover, even if the button becomes unanchored from the seat or cushion.

In accordance with this aspect of the invention, an upholstery button is provided comprising a head, a shank having ribs formed thereon proximate the head, and an annular washer which nonreleasably locks onto the ribs to provide a fixed spacing between the lock washer and the head.

Further in accordance with this aspect of the invention, the lock washer includes an axial bore and a plurality of teeth extending radially outwardly from the axial bore. Each of the teeth has a generally flat lower surface, a ramped upper surface, and a groove formed in the upper surface proximate an outer radial end thereof.

Another object of the invention is to provide a fluidtight connection, between the head of an upholstery button and the seat or cushion upon which the upholstery button is mounted, which is maintained even if the upholstery button is not anchored to the seat or cushion.

In accordance with this aspect of the invention, a process of connecting an upholstery button to a cushion comprises the steps of inserting a shank of a collet into a hole formed in a cover of the seat cushion, and inserting an annular lock washer onto the shank and clamping the cover between the lock washer and a head of the collet, thus forming a fluidtight seal between the cover and the head. Another step includes nonreleasably locking the lock washer in position. Further in accordance with this aspect of the invention, the step of locking the lock washer in position comprises sliding the lock washer to a position in which the lower surface of a tooth of the lock washer engages an upper surface of a rib formed on the shank of the collet.

BRIEF DESCRIPTION OF THE DRAWINGS

The above and other objects and features of the invention will become more readily apparent with reference to the detailed description which follows and to the accompanying drawings in which like reference numerals refer to like elements and in which.

DETAILED DESCRIPTION OF THE PREFERRED EMBODIMENT

Figure 1:
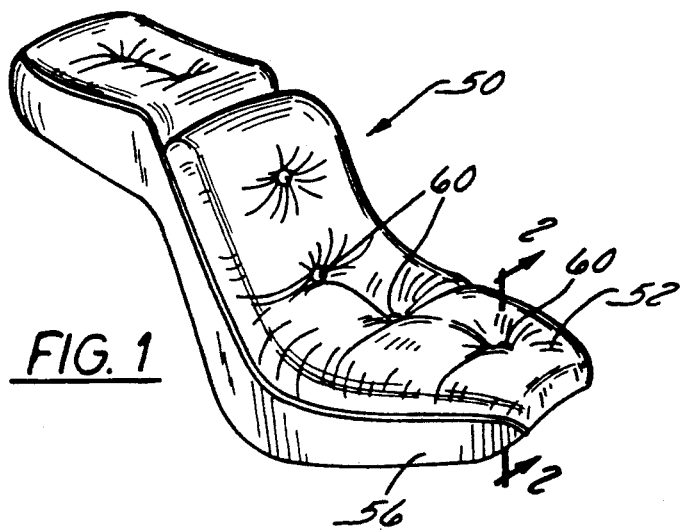
FIG. 1 is a perspective view of a motorcycle seat incorporating upholstery buttons constructed in accordance with the present invention.

Pursuant to the invention, an upholstery button is provided having a collet, an anchor, and a lock washer. The cover of a seat or cushion is securely clamped between the head of the collet and lock washer. The lock washer is locked in position without the action of any other clamping elements by the cooperation of the lock washer and ribs formed on the shank of the collet. The resulting connection reduces the possibility of the occupant's body catching on and damaging the button, and provides a watertight connection between the cover and the button, even upon failure of the anchor.

Referring to FIGS. 1-9 of the drawings, the upholstery buttons constructed in accordance with the present invention are used to secure a cover 52 of a seat 50 to the foam interior 54 and to compress the foam interior 54 such that the seat takes on the desired shape and appearance. As used herein the terms "upper" and "lower" shall be used for the sake of convenience to describe the relative orientations of the various parts of the button and the seat as they appear in the drawings. This should by no means be construed as a requirement that the seat and button must be oriented as illustrated but should instead be construed as a shorthand way of describing a relationship in which the button secures an outer cover of a seat onto the foam interior regardless of the orientation of the seat.

The cover 52 may be formed of leather, vinyl, or any other material which is relatively watertight and which is durable enough to function as a seat cover. The foam core 54 may be formed of foam rubber or any other suitable cushion material.

Referring to FIGS. 2-9, a button 60 constructed in accordance with the present invention includes a collet 62, a cap 64, and an anchor 66. The collet includes a shank 68 which is inserted through a hole formed in the outer cover 52 and into the foam core 54 of the seat 50, and a head 70 which rests against an upper surface of the cover 52. An annular lock washer 72 is provided inside of the cove 52 and nonreleasably clamps the cover between itself and the head 70 of the collet 62 and the cap 64 in a manner discussed in more detail below.

The shank 68 and head 70 of collet 62 ar preferably formed integral with one another and molded together out of a suitable relatively rigid plastic material. The shank 68 may be tapered to facilitate its insertion into the seat. Ribs 74 are formed on the shank 68 and extend circumferentially around the shank. A bore 76 is formed through the inner end of the shank for attachment to the anchor 66. The head 70 is raised on its outer periphery to provide greater surface area for connection to the cap 64, and the collet 62 is provided with a hollow interior 77 to conserve weight and materials. The cap 64 may include a cushioned interior 78.

In the illustrated embodiment, the anchor 66 includes a string 80, a tee element 82 and a washer 84. The string 80 includes a first end which is tied or otherwise connected to the bore 76 of the shank 68 and a second end which is connected to a bore 88 formed in tee element 82, which is in turn supported on the foam cushion 54 by the washer 84. Tee element 82 is preferably formed of a metal, and washer 84 is preferably formed of a relatively rigid plastic.

The annular washer 72 is preferably formed of a sturdy plastic material and includes a relatively flat lower surface 90 and an upper surface including a raised outer portion composed of a peripheral flange 92 and a recessed inner portion 94. A plurality of teeth 96 extend radially inwardly from the inner portion 94 and terminate at an axial bore formed through the washer. Each tooth is formed integral with the remainder of the lock washer 72 and includes a relatively flat lower surface 98 which is coplanar with the lower surface 90 of the washer, and a ramped upper surface 100. A shall 102 is formed in the outer radial the upper surface of each of the teeth 96. The individual teeth are separated by radial slots 104. These teeth 96 are designed to cooperate with the circumferential ribs 74 of shank 68, each of which has a flat upper surface and a ramped lower surface.

The upholstery button of the present invention is assembled and functions as follows: First, a seat 50 is provided having holes in the foam cushion 54 which are alignable with corresponding holes in the outer cover 52. Before the cover is secured to the foam interior, the tapered end of the shank 68 of the collet 62 is inserted through a hole in cover 52. Then, the collet is held in position, and the lock washer is inserted onto the shank 68 from the lower end of the shank and slid upwardly. When the teeth 96 of the lock washer 72 engage the lowermost rib 74 of shank 68, each tooth deflects downwardly at the groove 102 as it slides up the ramped lower surface of the rib. When each tooth reaches the top of the ramp of the lowermost rib, it snaps back to its original shape and rests on the relatively flat upper surface of the rib. Removal of the washer from the shank is prevented or at least severely inhibited by the flat upper surface of the rib and by the absence of a groove on the bottom surface of washer 72. Thus, sliding the washer 72 onto the shank 68 of the collet 62 provides a ratchet effect with relatively little resistance being provided against upward movement of the washer, but with a great amount of resistance being provided against return movement. Next, the lock washer 72 is pushed further up the shank 68, passing over successive ribs 74 until it tightly clamps the cover 52 between the washer 72 and the cap 64 and head 70.

By providing multiple ribs 74 on the shank 68 as discussed above and as illustrated in the drawings, the button is suitable for use with covers which vary greatly in width. That is, while the washer can be pushed up to the uppermost rib, as illustrated in FIG. 2, to securely clamp a relatively thin cover in place, the presence of the lower ribs enables the washer to be locked in positions at greater distances from the cap 64 and head 70, thus enabling the use of the button with thicker covers.

Figure 2:
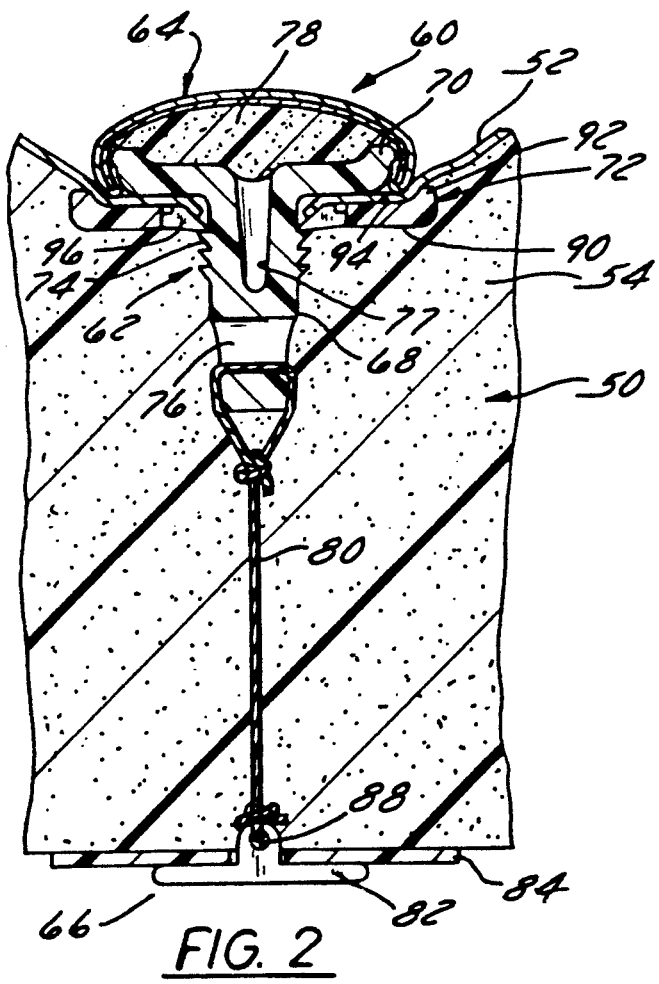
FIG. 2 is a sectional view taken along lines 2—2 of FIG. 1.
Figure 3:
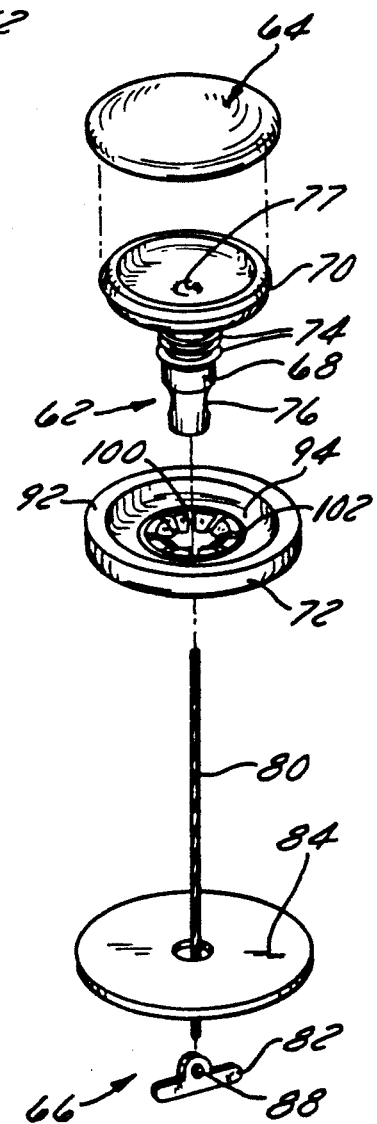
FIG. 3 is an exploded view of the upholstery button of FIG. 2.
Figure 5:
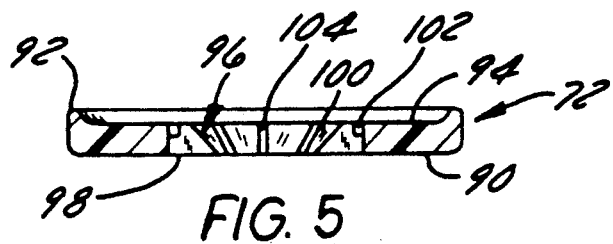
FIG. 5 is a sectional view taken along lines 5—5 of FIG. 4.
Figure 6:
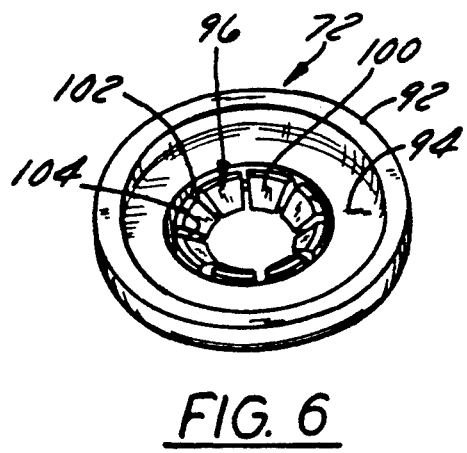
FIG. 6 is a perspective view of the lock washer of FIGS. 4 and 5.
Figure 4:
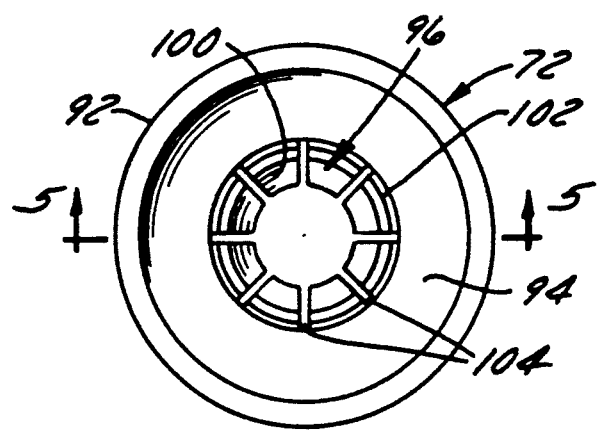
FIG. 4 is a plan view of the lock washer of the upholstery button of FIGS. 2 and 3.
Figure 7:
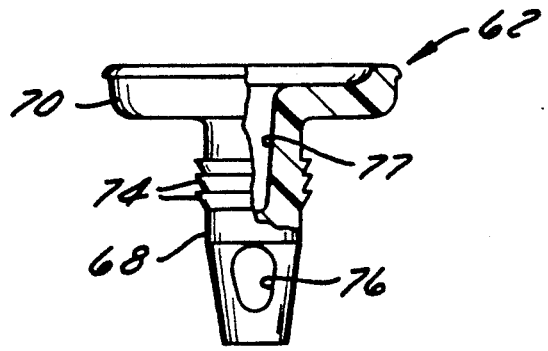
FIG. 7 is an elevation view, shown partially in cross section, of the collet of the upholstery button of FIGS. 2 and 3.
Figure 9:
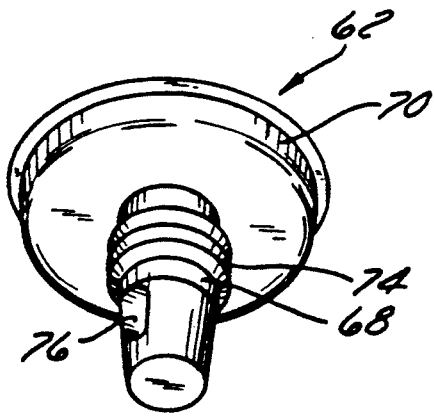
FIG. 9 is a perspective view of the collet of FIGS. 7 and 8.
Figure 8:
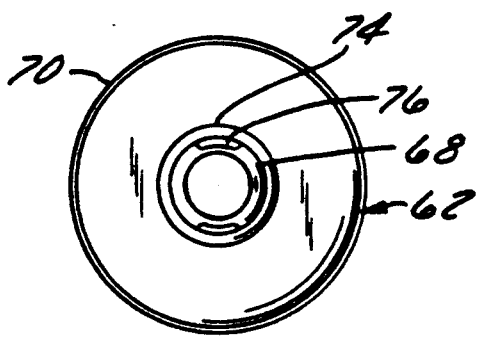
FIG. 8 is a plan view of the collet of FIG. 7.
Figure 10:
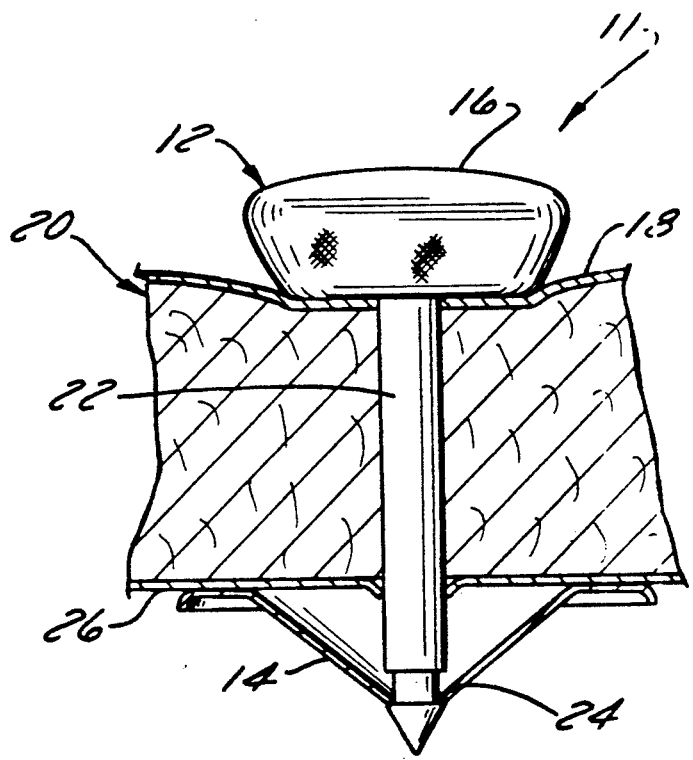
FIG. 10 is a sectional elevation view of a conventional upholstery button, appropriately labeled "PRIOR ART".

After the washer 72 is secured to the head 70 and cap 64, the string 80 and tee element 82 forming the anchor 66 are threaded through the mating hole in foam cushion 54 and pulled downwardly to compress the cushion as illustrated in FIGS. 1 and 2. The tee element is then twisted from a relatively vertical position to the horizontal position illustrated in FIGS. 1 and 2 and is seated on washer 84. The button is now securely anchored in position.

The thus completed assembly is watertight due to the fact that the cover 52 is securely clamped between the cap 64 and the head 70 and the lock washer 72. Because the head 70 and the lower end of the cap 54 are received in the recessed portion 94 the upper surface of the washer 72 defined by peripheral flange 92, an occupant's clothing cannot catch on the edge of the button, thereby preventing the cap from being twisted or lifted upwards and thus preventing or at least inhibiting the unintended removal of the cap 64 from the collet 62 or the breakage of string 80. Nevertheless, should the string 80 break for any reason or should the anchor 66 otherwise lose its anchoring ability, the seat will remain fluidtight due to the fact that tension by the string 80 is not required to clamp the cover 52 between the cap 64 and the washer 72. Thus, fluid tightness is virtually guaranteed even upon failure of anchor 66.

Although the preferred embodiment of the invention has been illustrated and described above, many additions and changes to the invention could be made without departing from the spirit and scope of the present invention. For example, the fluidtight connection between the cap and/or head and the seat cover could be enhanced by providing an O-ring or some other sealing element or sealant between the cap or the head and the seat cover. In addition, although the string-type anchor is preferred for its ease of manufacture, any other suitable anchor could be used in its place. Finally, the individual components need not be constructed of the disclosed materials or be formed in the disclosed shape, but could be provided in virtually any configuration which employs a ratchet-type action to nonreleasably clamp a seat cover between a lock washer and the head of an upholstery button so as to provide a watertight seal between the button and the seat cover, even upon failure of the button's anchor.

I claim:

1. An upholstery button comprising:
   A. a head;
   B. a shank having ribs formed thereon proximate said head; and
   C. an annular lock washer having at least one flexible device which nonreleasably locks said lock washer onto at least one of said ribs to provide a fixed spacing between said lock washer and said head, at least one of said device of said lock washer and said ribs having a shape which facilitates insertion of said lock washer onto said shank but which inhibits removal of said lock washer from said shank, said lock washer further including groove means for facilitating flexing of said device away from said head, thus facilitating movement of said lock washer along said shank toward said head, and for inhibiting flexing of said device toward said head, thus inhibiting movement of said lock washer along said shank away from said head.

2. An upholstery button according to claim 1, wherein said lock washer includes an upper surface having a raised outer portion and a recessed inner portion.

3. An upholstery button according to claim 2, wherein said head is at least partially received in said recessed portion of said upper surface of said lock washer.

4. An upholstery button according to claim 1, further comprising a cap affixed to said head.

5. An upholstery button according to claim 1, further comprising an anchor which is connected to said shank.

6. An upholstery button according to claim 5, wherein said anchor comprises a retaining device and a string having a first end connected to said shank and a second end connected to said retaining device.

7. An upholstery button according to claim 1, wherein said means for facilitating and for inhibiting comprises a groove formed in an upper surface of said device of said lock washer proximate an outer radial end thereof.

8. An upholstery button comprising:
   A. a head;
   B. a shank having ribs formed thereon proximate said head; and
   C. an annular lock washer which nonreleasably locks onto at least one of said ribs to provide a fixed spacing between said lock washer and said head, wherein said lock washer includes an axial bore and a plurality of teeth which extend radially outward from said axial bore, each of said teeth having a generally flat lower surface, a ramped upper surface, and a groove formed in said upper surface proximate an outer radial end thereof.

9. A cushion comprising:
   A. a cushion element;
   B. a cover disposed on an upper surface of said cushion element and having a hole formed therethrough; and
   C. an upholstery button, said upholstery button including
      a head disposed above said cover;
      a shank which is connected to said head, which extends through said hole formed in said cover and into said cushion, and which has ribs formed thereon,
      a lock washer which is disposed inside said cushion, which is nonreleasably locked to at least one of said ribs, and which clamps said cover to said head so as to form a fluidtight connection between said head and said cover, and
      an anchor which is connected to said shank and which extends through said cushion and anchors said upholstery button in place.

10. A cushion according to claim 9, wherein said anchor includes a retaining device disposed outside of said cushion and a string having a first end connected to said shank and a second end connected to said retaining device.

11. A cushion according to claim 9, further comprising a cap secured to an upper surface of said head, and wherein said lock washer has a recess which is formed in an upper surface thereof and which receives said cap.

12. A cushion comprising:
    A. a cushion element;
    B. a cover disposed on an upper surface of said cushion element and having a hole formed therethrough; and
    C. an upholstery button, said upholstery button including
       a head disposed above said cover;
       a shank which is connected to said head, which extends through said hole formed in said cover and into said cushion, and which has ribs formed thereon,
       a lock washer which is disposed inside said cushion, which is nonreleasably locked to at least one of said ribs, and which clamps said cover to said head so as to form a fluidtight connection between said head and said cover, wherein said lock washer includes an axial bore and a plurality of teeth extending radially outward from said axial bore, each of said teeth having a generally flat lower surface, a ramped upper surface, and a groove formed in said upper surface proximate an outer radial end thereof.

13. A process of connecting an upholstery button to a cushion comprising the steps of:
   A. inserting a shank of a collet into a hole formed in a cover of said cushion;
   B. inserting an annular lock washer onto said shank and clamping said cover between said lock washer and a head of said collet, thereby forming a fluid-tight seal between said cover and said head; and
   C. nonreleasably locking said washer in position by sliding said lock washer to a position in which a lower surface of a tooth of said lock washer engages an upper surface of a rib formed on said shank, at least one of said tooth and said rib having a shape which facilitates insertion of said lock washer onto said shank but which inhibits removal of said lock washer from said shank, said locking step further including facilitating flexing of said tooth away from said head, thus facilitating movement of said lock washer along said shank toward said head, and inhibiting flexing of said device toward said head, thus inhibiting movement of said lock washer along said shank away from said head.

14. A process according to claim 13, further comprising anchoring said upholstery button to said cushion.

15. A process of connecting an upholstery button to a cushion comprising the steps of:
   A. inserting a shank of a collet into a hole formed in a cover of said cushion;
   B. inserting an annular lock washer onto said shank and clamping said cover between said lock washer and a head of said collet, thereby forming a fluid-tight seal between said cover and said head;
   C. nonreleasably locking said washer in position; and
   D. providing an anchor including an elongated element having a first end connected to said shank and a second end connected to a retaining device, then drawing said retaining device through said cushion, and then supporting said retaining device on an outer surface of said cushion, thus anchoring said upholstery button to said cushion.

16. An upholstery button comprising:
   A. a head;
   B. a shank having ribs formed thereon proximate said head; and
   C. an annular lock washer which nonreleasably locks onto at least one of said ribs to provide a fixed spacing between said lock washer and said head, said lock washer including a raised peripheral flange surrounding a recessed inner portion, at least a portion of said head being received in said recessed inner portion of said lock washer and being surrounded by said raised peripheral flange so as to inhibit the catching of objects on said head.

* * * * *